Patented May 11, 1937

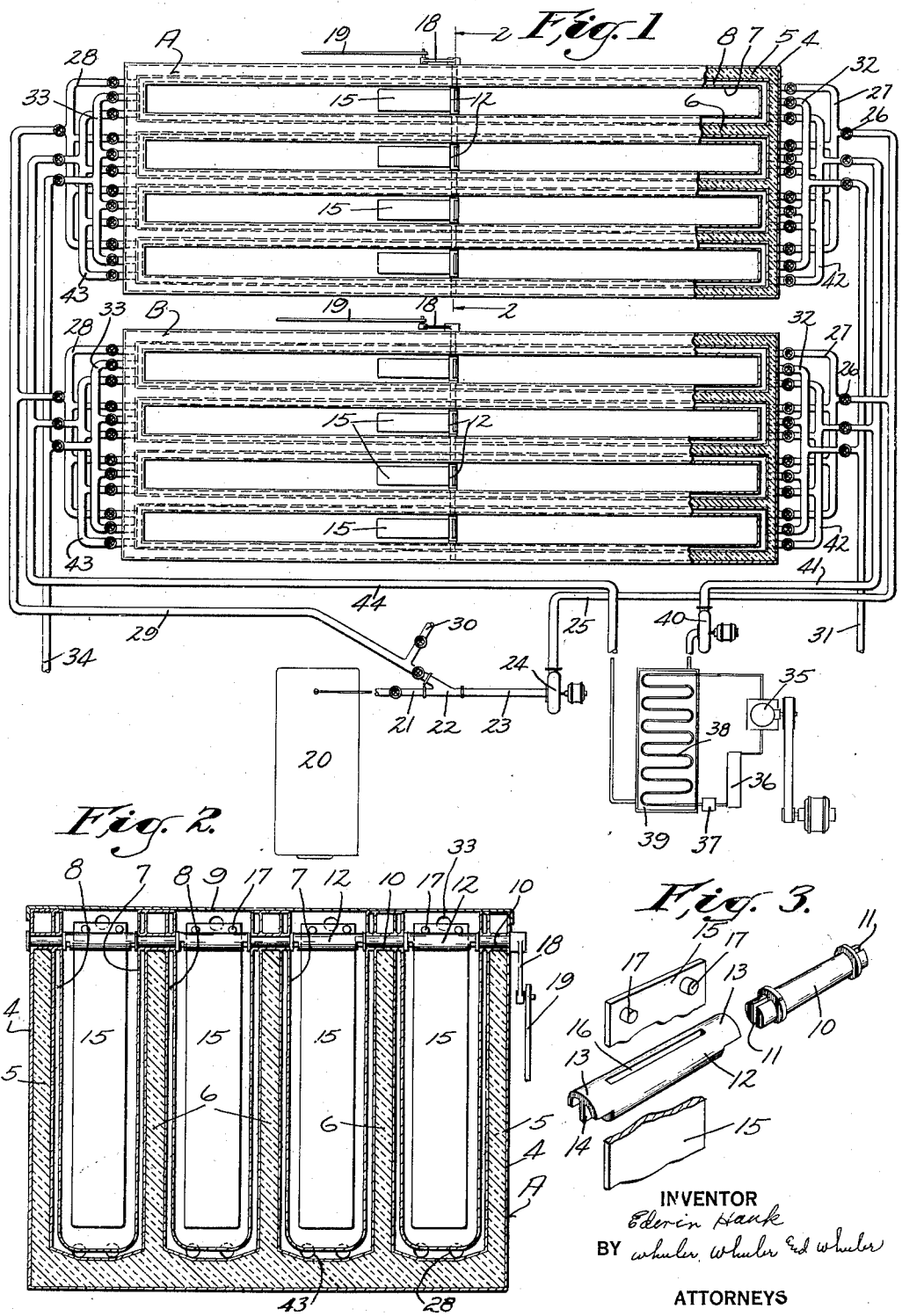

2,080,370

UNITED STATES PATENT OFFICE 2,080,370

APPARATUS FOR HANDLING DAIRY PRODUCTS

Edwin Hauk, Milwaukee, Wis., assignor of one-half to Marion L. Crouch and Orpha M. Crouch, both of Milwaukee, Wis.

Application July 28, 1933, Serial No. 682,584

13 Claims. (Cl. 31—47)

This invention relates to improvements in apparatus for handling dairy products.

It is the major object of this invention to provide novel and improved means for speedily accomplishing the heating and cooling of dairy products without undesirable agitation.

Other objects of the invention relate to the provision of a novel and improved piece of dairy equipment in which large scale dairy operations may be conducted by subdividing the materials involved, or in which a number of entirely separate and distinct dairy operations may be conducted side by side in the same piece of apparatus, thereby effecting great economies for the small operator; the provision of an apparatus for the accomplishment of a novel and improved process for producing cultured milk products; the provision of a novel and improved piece of apparatus in which heating and cooling are economically handled with small losses; the provision of a novel piece of dairy equipment in which convenient provision is made for agitating and refraining from agitating different products according to their various requirements; and the provision of a piece of dairy equipment capable of being developed on the unit system to meet the requirements of the smallest and the largest installations.

In the drawing:

Figure 1 is a plan view of apparatus embodying the invention, the boiler and refrigerating mechanism for heating and cooling the same being illustrated diagrammatically on a reduced scale.

Figure 2 is a detail view taken in section in the plane indicated at 2—2 in Figure 1.

Figure 3 is a fragmentary detail view on an enlarged scale showing portions of the stirring or agitating devices which are removably positioned in the apparatus shown in Figures 1 and 2.

Like parts are identified by the same reference characters throughout the several views.

Fig. 1 shows the operative assembly of two identical units A and B of apparatus embodying my invention. Each comprises a shell or casing 4 having thermally insulated walls 5 and thermally insulated partitions 6 subdividing its interior into long narrow cells. Within each such cell is a long narrow tank 7, preferably not exceeding 8" in width and provided at 8 with a jacket. The tank is preferably rounded at the corners to facilitate cleaning, and the entire unit, or each section thereof separately, is provided with a cover 9.

In each side of the unit and in each partition thereof is journaled a short length of shaft 10 slotted at its ends 11 (Fig. 3). The shaft sections 10 may be connected for motion transmission purposes by means of removable connecting shafts 12 hooded at 13 to engage over the ends of shaft sections 10, and provided integrally or otherwise with keys at 14 receivable into the slots 11.

The connecting shaft sections 12 are also slotted, so that the paddles 15 may be dropped through slots 16 to the limit permitted by stop pegs 17 in any one of the several tanks 7 in which agitation is desired. Where agitation is not desired, the paddle 15 may simply be withdrawn from shaft section 12.

For cleaning purposes any one or more of the shaft sections 12 may be lifted readily from the position shown in Fig. 2, and the entire interior of the tank is thereby exposed for cleaning. Oscillation is applied to the end section of the series of shafts by means of crank arms 18 and links 19, actuated from a suitable source of power.

The several jackets may be heated, refrigerated, or tempered as desired, by means of a fluid such as water circulated through suitable heating and cooling devices or supplied from a tap source.

The heating system includes a boiler 20 from which steam is supplied through pipe 21 to an injector fitting 22, whereby such steam is injected into water in line 23, thereby heating and inducing the circulation thereof. For accelerating the circulation I may use a centrifugal motor driven pump 24. The heated water passes through pipe 25 under control of valves 26 to headers 27 supplying the respective units A and B. From each such header a valve controlled pipe leads to the jacket spaces about each individual tank. At the opposite end of the jacket space of the individual tanks, valve controlled pipes communicate with the hot water return headers 28 from which the returned hot water passes through pipe 29 back to the injector fitting 22 or to the valved discharge pipe 30.

For tempering, a water supply line 31 is placed in valve controlled communication with headers 32 from which valved pipes lead to the several jackets. Similar valve controlled pipes lead to the headers 33, which are in valve controlled communication with a discharge line 34.

For refrigeration, a motor driven refrigerating compressor 35 and radiator 36 are connected through expansion valve 37 with the absorption coil 38 in a brine tank 39. The brine in tank 39 is circulated from motor driven pump 40 through pipe 41 to the headers 42 of the respective units and thence, through individual valve controlled pipes to any particular jacket space of a specific tank. The return circulation is valve controlled from the particular jacket spaces to the headers 43 and thence through pipe 44 back to the brine tank 39.

The thermal insulation in the partitions and the side walls of the units A and B not only economizes in the operation of the device by minimizing heat losses, but also makes it possible to conduct a chilling operation in one of the elongated tanks 7 concurrently with a heating operation in an adjacent tank. The apparatus is under full control of the operator, so that upon the conclusion of a heating operation in a given tank the contents of the tank may be tempered with fresh water and immediately thereafter may be chilled by artificial refrigeration.

The narrow and elongated form of the tanks is very advantageous for a number of different reasons. In the first place, it permits of the speedy heating and cooling of the contents of the tanks without undesirable agitation. It will be shown in connection with the description of my improved process that in handling certain dairy products the best results cannot possibly be secured where the product is agitated prior to its cooling. Yet there has been no dairy apparatus in which the cooling could be effected with the necessary speed and without agitation. Tests have demonstrated the fact that my improved apparatus cools the product with more than sufficient rapidity and without requiring agitation for the purpose of bringing all portions of the material into intimate contact with the cooling surfaces. I have found that a width of 10" for the tank 7 is about the practical limit of the width of such a tank in which cooling can be rapidly effected without agitation. In order to achieve sufficient capacity in a tank having the preferred width of 8" or less, it is necessary to provide a very elongated tank as shown. 125 gallons is a satisfactory commercial capacity. This may be had in a tank 8" wide, 10' long, and a little over 2½' in effective depth.

In the second place, this form of tank is desirable because of economies of space and convenience of manipulation made possible by the tank organization in a series of units as shown. The header organization is particularly simple, effective, and easily controlled in the device illustrated as compared with the pipe system which would be necessary if the tanks were of any other form.

In the third place, the agitating mechanism reduces itself to a very simple form, permitting easy cleaning and easy operation, where the tanks are organized as illustrated.

As above noted, a number of different dairy processes can be carried on simultaneously in adjacent tanks embodying this invention. These tanks are well adapted for pasteurization and other treatment of milk, and are also useful in the manufacture of cheese. There is one process, however, which, through the use of the apparatus herein disclosed, reaches a degree of perfection never heretofore achieved commercially. That is the process of making cultured milk.

When milk is treated with a Bulgarian, or other well known buttermilk culture, the culture is introduced into the body of milk and the mixture is allowed to stand for a considerable period, during which a heavy curd forms therein. One of the objectives in buttermilk culture is to prevent whey separation. Some separation invariably occurs in previous commercial processes because the cultured milk is stirred or agitated before it is completely cooled. If the product can be brought down to a temperature of 45 or 50 degrees without agitation of any sort, it can then be agitated vigorously to the form of a fine creamy homogeneous milk with virtually no whey separation. If, however, the mixture is agitated before reaching this low temperature, either by mechanical agitation or by convection currents, the whey will separate and the product will be inferior to a greater or less degree, according to the amount of separation.

In a long narrow tank which does not exceed 10" in width and which is jacketed in accordance with the disclosure of this invention, it is possible to cool the product with sufficient rapidity so that no agitation is necessary. Furthermore, the long narrow tank permits the cooling of its contents at substantially the same rate throughout the mass, so that no convection currents tend to occur. Thus, the entire mass is cooled quickly and uniformly to the required low temperature, and may be stirred up at that temperature to produce a creamy milk, perfectly homogeneous throughout, and unequaled by any previous commercial product.

I claim:

1. Dairy apparatus comprising a series of narrow tanks having a length many times exceeding their width, a common casing for said series of tanks in which they are arranged side by side, jackets for the individual tanks, and means for thermally insulating said tanks from each other.

2. Dairy apparatus comprising the comination of a casing provided with thermally insulated apparatus subdividing it lengthwise into elongated cells, of a jacketed tank in each such cell of extremely narrow width and a length and depth each many times exceeding the width of the cell, whereby to be sufficient to give it a commercial capacity.

3. Dairy apparatus comprising the unitary assembly of a casing, thermally insulated partition means subdividing said casing longitudinally into long narrow independent cells, jacketed tanks in the respective cells not exceeding ten inches in width, separate headers at the ends of said casing, and valve controlled means affording communication between said headers and the jackets of the respective tanks.

4. Dairy apparatus comprising the combination with a series of laterally adjacent tanks, of agitating means spanning said series of tanks, and agitators for the individual tanks removably connected with said means for the selective agitation of the contents of a particular tank during the operation of said means.

5. Dairy apparatus comprising the combination with a series of laterally adjacent tanks, of shaft sections between said tanks, connecting shaft sections removably arranged to transmit motion between said first mentioned shaft sections and spanning the respective tanks, and agitating means removably connected with the removable shaft sections.

6. Dairy apparatus comprising a jacketed tank not exceeding ten inches in width and having sufficient depth and length each many times in excess of its width whereby to achieve commercial capacity.

7. Dairy apparatus comprising a jacketed tank not exceeding ten inches in width and having sufficient depth and length each many times in excess of its width whereby to achieve commercial capacity, and means for selectively circulating heating and cooling mediums through the jacket of said tank for the rapid heating and cooling of its contents without agitation.

8. Dairy apparatus comprising the combination of a plurality of tanks in laterally adjacent series, agitator shaft sections permanently provided with bearings in spaced relation across one of said tanks, a removable shaft section engageable between said permanently positioned shaft sections for the transmission of motion therebetween across one of said tanks, and an agitator detachably suspended from said removable shaft section.

9. Dairy apparatus comprising the combination with a pair of shaft sections provided with permanent bearings and having slotted ends, of an intermediate shaft section provided with keys engageable in said slotted ends, and means for removably supporting the intermediate shaft section from the other shaft sections for the transmission of motion therebetween.

10. In a device of the character described the combination with a slotted shaft element of a paddle receivable in and removable from the slot of said element, and means limiting the movement of said paddle through said element.

11. Dairy apparatus comprising the combination with a series of laterally adjacent tanks, of a rock shaft means extending transversely across the tanks of said series, and agitating paddles individually engageable with and removable from said rock shaft means to receive support and movement therefrom for the agitation of the contents of selected tanks.

12. Dairy apparatus comprising a tank, a slotted actuator provided with means supporting it for oscillation above the tank, and a paddle receivable in the slot of the actuator and withdrawable bodily therethrough, said paddle being provided with stop means limiting its movement through the slot for supporting it from the actuator for oscillation therewith in a position to agitate the contents of the tank.

13. Dairy apparatus comprising the combination with a tank and an oscillatory actuator provided with a support above the tank, of a paddle operable in the tank for the agitation of the contents thereof, and means removably suspending said paddle upon said actuator to receive movement from the actuator, said paddle being freely withdrawable from the tank and the actuator.

EDWIN HAUK.